United States Patent [19]
Majercak

[11] Patent Number: 5,460,502
[45] Date of Patent: Oct. 24, 1995

[54] PLUNGER APPARATUS USED IN A RESIN MOLDING DEVICE FOR ENCAPSULATING ELECTRONIC COMPONENTS

[76] Inventor: Michael L. Majercak, 2168 E. Balboa Dr., Tempe, Ariz. 85282

[21] Appl. No.: 122,786

[22] Filed: Sep. 15, 1993

[51] Int. Cl.⁶ .............................. B29C 45/02; B29C 45/14
[52] U.S. Cl. ...................... 425/116; 425/129.1; 425/544; 425/DIG. 228; 264/272.17
[58] Field of Search ...................... 425/116, 117, 425/129.1, 121, 544, DIG. 228, 588; 264/272.17; 249/95

[56] References Cited

U.S. PATENT DOCUMENTS

| | | | |
|---|---|---|---|
| 4,386,898 | 6/1983 | Sera | 425/145 |
| 4,480,975 | 11/1984 | Plummer et al. | 425/116 |
| 4,554,126 | 11/1985 | Sera | 264/272.17 |
| 4,680,617 | 7/1987 | Ross | 357/72 |
| 4,708,613 | 11/1987 | Sera et al. | 425/117 |
| 4,812,114 | 3/1989 | Kennon et al. | 425/116 |
| 4,872,825 | 10/1989 | Ross | 425/117 |
| 4,900,485 | 2/1990 | Murakami | 425/129.1 |
| 4,900,501 | 2/1990 | Saeki et al. | 264/272.17 |
| 4,954,307 | 9/1990 | Yokoyama | 264/272.15 |
| 4,983,110 | 1/1991 | Yoshida et al. | 425/116 |
| 5,123,826 | 6/1992 | Baird | 425/129.1 |
| 5,158,780 | 10/1992 | Schraven et al. | 425/116 |

FOREIGN PATENT DOCUMENTS

| | | | |
|---|---|---|---|
| 59-201428 | 11/1984 | Japan | 264/272.17 |
| 60-56520 | 4/1985 | Japan | 425/544 |
| 60-125616 | 7/1985 | Japan | 425/129.1 |
| 62-55112 | 3/1987 | Japan | 425/129.1 |
| 62-184821 | 8/1987 | Japan | 425/544 |
| 62-206842 | 9/1987 | Japan | 425/544 |

Primary Examiner—Khanh P. Nguyen
Attorney, Agent, or Firm—Donald J. Lisa

[57] ABSTRACT

An improved plunger apparatus used in a resin molding device for encapsulating electronic components. At least one annular recess is located in the bottom side of the plunger. The annular recess redirects the plasticized resin to flow towards the mold cavities in the molding device and away from the interface between the plunger and the cylinder of the molding device, thereby optimizing the flow of resin to the cavities and reducing the tendency of excess gas and resin to flow away from the cavities. At least one flat side is located in the lengthwise surface of the plunger. The flat side forms an enlarged clearance in the interface between the flat side and the cylinder of the molding device. The enlarged clearance receives and provides an outlet for any excess gas or resin that flows in the interface. The improved plunger still stably guides within the cylinder, and the improved plunger allows the molding apparatus to encapsulate electronic components more economically, efficiently, and effectively.

12 Claims, 2 Drawing Sheets

PLUNGER APPARATUS USED IN A RESIN MOLDING DEVICE FOR ENCAPSULATING ELECTRONIC COMPONENTS

BACKGROUND OF THE INVENTION

1. Fields of the Invention

The present invention relates generally to a plunger that is used in a resin molding device for encapsulating electronic components, and, more particularly, to an improved plunger that is designed and constructed so that the molding apparatus encapsulates electronic components more economically, efficiently, and effectively.

2. Discussion of Background and Prior Art

Resin molding apparatuses for encapsulating electronic components, such as, semiconductor devices are well known. A standard resin molding apparatus typically includes a mold assembly that has an upper mold element interfacing with a lower mold element which provides a mold cavity in the interface between the two elements. A set of electronic components, such as a semiconductor device supported at its outer periphery by a lead frame, is placed inside the mold cavity. The lead frame is in turn supported on an edge in the mold cavity. A cylinder, for moving resin into the cavity is located in the molding apparatus near each mold cavity.

The cylinder is pre-heated to a certain temperature and then a thermosetting resin tablet is inserted into the lower end of the cylinder beneath the plunger and is further heated until it is plasticized. The plasticized resin flows to a pot. Typically, a passageway (i.e. "cull") or runner in the interface between the mold elements links the cylinder with the mold cavity. Sometimes the cylinder and plunger are in the upper mold element which closes directly onto a mold cavity located directly beneath the cylinder in the lower mold cavity. The plasticized resin flows in the cull from the cylinder to the mold cavity to encapsulate the semiconductor devices.

The motive force for getting the plasticized resin to the mold cavity is a plunger slidably mounted within the cylinder which contacts and pushes the plasticized resin through the passageway to each mold cavity. A reciprocating means is typically mounted to a top side of the plunger for reciprocating the plunger within the cylinder. After the resin reaches the mold cavity encapsulating the semiconductor devices, the mold is opened, the devices removed, and the resin cured.

One problem with the prior art molding apparatus is that the plungers are typically designed with flat bottom surfaces. When a flat surfaced plunger is pushed down in the cylinder against the plasticized resin, it causes a turbulence in the flow of the resin underneath the cylinder and within the cull. The turbulent resin is not smoothly directed toward the cavity and much of the resin tends to flow to undesired areas in the molding apparatus instead of to the desired mold cavities. Specifically, the turbulent or outward flow of the resin at the bottom side of the plunger causes some of the resin to flow into interfaces between the upper and lower mold elements and into the interface between the outer surface of the plunger and the inner surface of the cylinder between which there is a sliding clearance fit.

Resin that flows into these interfaces causes difficulties in opening the molds because the resin cures quickly, and this curing of the resin in these interfaces results in excessive cleaning costs and frictional resistance to the sliding plunger during its operation. Since the plunger does not slide as freely or efficiently, the frictional resistance also results in excessive wear of the plunger requiring more frequent replacement and excessive down-time for the mold.

Resin that flows into the undesired interfaces results in still further problems. More resin in the undesired interfaces means less resin flowing into the mold cavity. A defect in molding, therefore, may occur because insufficient amounts of resin may not reach the mold cavity. Additionally, the resin in the interface can begin to harden and cure if the mold is not opened quickly, causing further resistance to retracting the sliding plunger in the cylinder with the reciprocating means. Often the reciprocating means is physically pulled out of its attachment to the plunger resulting in damage to the plunger requiring shutdown until repairs can be made.

Some prior art plungers provided a groove in the lengthwise surface of the plunger to create an enlarged clearance in the interface between the plunger and cylinder as a means to allow any excess gas or resin to flow into the interface, thereby providing an outlet for the excess gas or resin. The problem with using such lengthwise surface grooves was that the amount of excess gas or resin that the plunger surface could receive was limited by the sizes of the grooves. Some prior art plungers were designed to provide enlarged clearances at the plunger-cylinder interface by having a smaller diameter upper portion of the plunger and a larger diameter lower portion of the plunger. The problem with such a plunger, however, was that the plunger would wobble in the cylinder and could not be stably guided through its reciprocation in the cylinder because of the differential in diameters of the upper and lower portions. The wobbling aggravated the condition of having excessive resin flowing into the piston-cylinder interface.

Therefore, there is a need for a plunger used in a molding apparatus for encapsulating semiconductors that causes resin to optimally flow towards the desired mold cavities and away from undesired areas, such as, the upper-lower mold element interface and the cylinder-piston interface described above. Furthermore, there is a need for a plunger that provides more outlets for resin that flows into the piston-cylinder interface but is still able to stably guide the plunger through its reciprocating path in the cylinder.

In overcoming these problems and limitations of the prior art, it is an object of the present invention to encapsulate electronic components in a resin molding apparatus wherein the apparatus includes a plunger design that provides greater capacity to receive excess gas or resin that does manage to escape into the interface between the plunger and the cylinder.

It is another object of the present invention to encapsulate electronic components in a resin molding apparatus wherein the apparatus has a plunger that reduces turbulent flow of the resin and causes the resin to optimally flow towards the desired mold cavities and away from any undesired areas or interfaces within the mold apparatus.

It is a further object of the present invention to provide a plunger that is used in a molding apparatus for encapsulating electronic components wherein the plunger is stably guided within the cylinder.

SUMMARY OF THE INVENTION

Set forth below is a brief summary of the invention which solves the foregoing problems and achieves the foregoing and other objects, benefits, and advantages in accordance with the purposes of the present invention as embodied and broadly described herein.

One aspect of the invention is in a resin molding apparatus for encapsulating electronic components. This apparatus has at least one mold assembly which includes both an upper mold element and a lower mold element for providing a mold cavity in which a set of electronic components to be encapsulated is placed, at least one cylinder located in the molding apparatus adjacent each mold cavity for introducing plasticized resin into the apparatus, a plunger having a bottom side and a lengthwise surface slidably mounted within the cylinder and having an interface therebetween for contacting and pushing plasticized resin into each mold cavity, and a reciprocating means mounted to a top side of the plunger for reciprocating the plunger that slides within the cylinder. The improvement in this apparatus includes a plunger that has at least one flat side in an upper portion of the lengthwise surface that forms an enlarged clearance in the plunger-cylinder interface for receiving resin flowing in the interface, whereby an outlet for excess resin is provided.

A second aspect of the present invention is the improved resin molding apparatus which includes a plunger that has at least one annular recess in the bottom side for flowing plasticized resin towards a mold cavity and away from the interface, whereby the flow of resin to the cavity is optimized by reducing the tendency of excess resin to flow away from the cavity.

A third aspect of the invention is an improved molding apparatus wherein the plunger further includes a circumferential groove in the lengthwise surface of the plunger forming a first enlarged clearance in the interface for receiving resin flowing in the interface whereby a first outlet for excess resin is provided, at least one flat side in an upper portion of the lengthwise surface forming a second enlarged clearance in the interface for further receiving resin flowing in the interface past the bottom side of the plunger whereby a second outlet for excess resin is provided, and an upper portion and a lower portion of the plunger having a common diameter of a circle circumscribing the outermost periphery of the lengthwise surface of the upper and lower portions whereby the plunger is stably guided on said portions during reciprocation in the cylinder.

A further feature of the invention is that the annular recess in the bottom side of the plunger has a concave profile in a plane passed through the recess and the longitudinal axis of the plunger.

DETAILED DESCRIPTION OF THE INVENTION

FIGS. 1–11 show various embodiments of the improved plunger that is used in a resin molding device for encapsulating electronic components. These embodiments have unique features that allow the improved plunger to overcome the limitations and problems of the prior art plungers. The various embodiments and the unique features are now described in more detail.

1. The Improved Plunger Mounted in a Molding Apparatus

Figure 1:
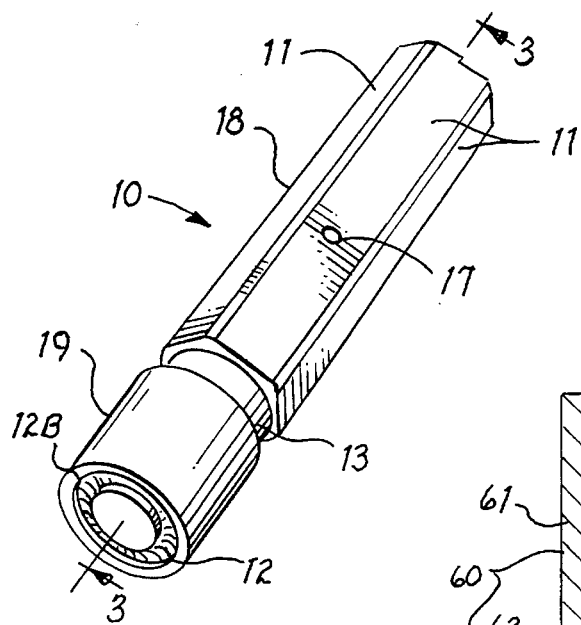
FIG. 1—Perspective view of the preferred embodiment of improved plunger used in a resin molding apparatus for encapsulating electronic components.

FIG. 1 shows the preferred embodiment of the improved plunger 10.

Figure 2:
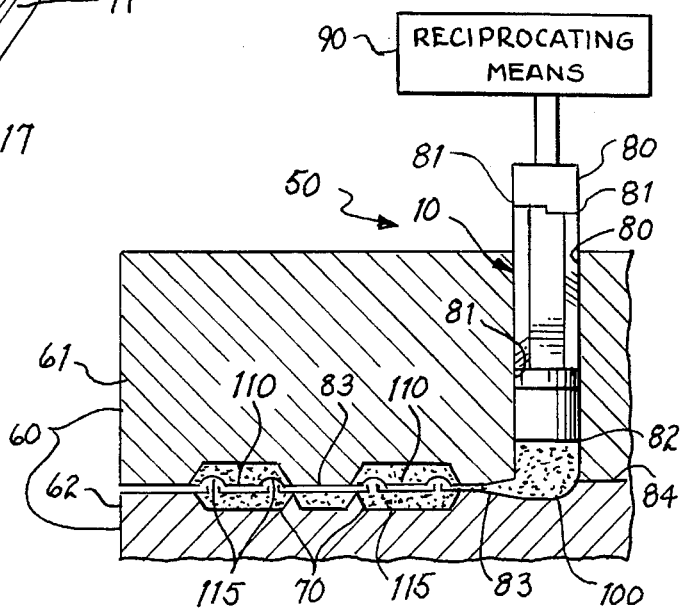
FIG. 2—Side sectional elevation view of a resin molding apparatus for encapsulating electronic components showing the plunger in FIG. 1 slidably mounted within the molding apparatus.

As shown in FIG. 2, plunger 10 is mounted in a standard resin molding apparatus 50 that encapsulates electronic components. Molding apparatus 50 comprises a mold assembly 60 that has an upper mold element 61 and a lower mold element 62. Mold cavities 70 are provided by the upper element 61 and lower element 62 contacting each other. A set of electronic components 110 is placed inside each mold cavity 70. A lead frame 115 is located at the outer periphery of electronic components 110 to support the components inside the mold cavity 70.

A cylinder 80 is located adjacent at least one mold cavity 70. A pot 82 is located underneath cylinder 80, and a passage (i.e. "cull") 83 links the cylinder 80 with the mold cavity 70. Cylinder 80 communicates through the passage 83 for introducing plasticized resin 100 into the mold cavity 70. Plunger 10 is slidably mounted within cylinder 80. Alternatively, any of the other plunger embodiments disclosed in this application may instead be mounted within cylinder 80.

The small operating clearance between the lengthwise surface of the plunger 10 and the inner surface of the cylinder 80 creates an interface 81 therebetween. Resin 100 is heated, introduced into molding apparatus 50 beneath cylinder 80 and then is further heated until it is plasticized. The resin 100 flows downward into the cull and sits in pot 82. A means 90 for reciprocating the plunger 10 is mounted to a top side of the plunger 10, and the reciprocating means 90 pushes the plunger in the cylinder 80 to contact and push the plasticized resin 100.

The resin 100 then flows into the mold cavities 70. The resin 100 cures in the mold cavities 70 thereby encapsulating the electronic components 110. The problem with using prior art plungers in molding apparatus 50 is that as the plunger reciprocated to contact and push resin 100, some resin 100 flowed away from mold cavities 70 and towards undesired areas such as into upper-lower mold interface 84 and plunger-cylinder interface 81. Resin 100 that flowed into interfaces 81, 84 caused the limitations and problems discussed earlier.

2. The Improved Plunger

Figure 3:
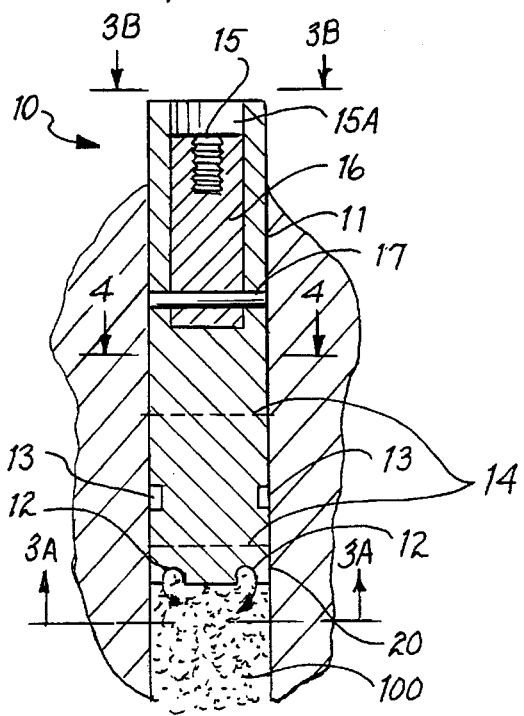
FIG. 3—Cross sectional view of the plunger taken along the line 3—3 of FIG. 1 additionally showing the resin and cylinder.
Figure 3A:
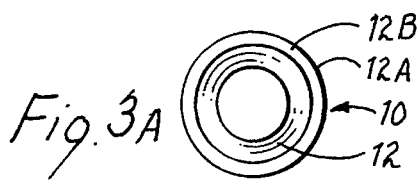
FIG. 3A—Bottom elevational view of the plunger taken along the line 3A—3A of FIG. 3.
Figure 3B:
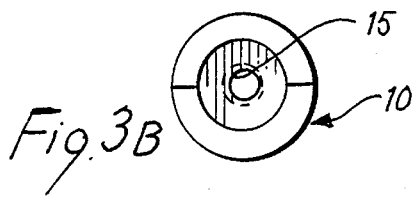
FIG. 3B—Top elevational view of the plunger taken along the line 3B—3B of FIG. 3.

As shown in FIGS. 3 and 3B, the improved plunger 10 has a recess 15A and a threaded portion 15 at its upper portion. Originally, plunger 10 was made from steel material, and a hole could be tapped through the top to easily form the threaded portion 15. However, carbide is now the material that is typically used to manufacture plunger 10, and a hole could not be easily bored through the carbide material. Therefore, a plug 16 made from a softer carbon steel material, as shown in FIG. 3, was silver soldered at a high temperature (i.e. 1400° F.) into an inner recess in the upper portion of plunger 10, and the threaded portion 15 was bored into the plug 16.

As seen in FIG. 2, when resin 100 in the interface 81 quickly cured on the surfaces of plunger 10, such as, when mold assembly 60 was not opened fast enough, the cured resin prevented the plunger 10 form being easily retracted in cylinder 80. As the reciprocating means 90 pulled harder to retract plunger 10 stuck in cylinder 80, stress on the softer plug 16 was significantly increased, and frequently plug 16 would be pulled out of its mounting in plunger 10 or, often the threads 15 of the screw mounting would be stripped as reciprocating means 90 was pulled loose from plug 16 disabling the apparatus. The solution to this problem is the insertion of a locking pin 17 through plunger 10 and plug 16. The pin 17 then retained plug 16 within plunger 10 unless the retracting force exceeds the sheer strength of pin 17, which it never does.

Plunger 10 is mounted to a molding apparatus 50 by screwing its threaded portion 15 to a reciprocating means 90 as shown in FIGS. 3 and 3B. Plunger 10 is slidably mounted within cylinder 80, and it contacts and pushes the plasticized resin 100 as the plunger 10 reciprocates.

A pot 82 is located underneath cylinder 80 below the plunger 10, and a passage (i.e. "cull") 83 leads from the cylinder 80 to the mold cavity 70 for introducing plasticized resin 100 into the mold cavity 70.

The improved plunger has the following features:

a. Circumferential Groove in the Lengthwise Surface

As shown in FIG. 1, plunger 10 has at least one circumferential groove 13 in its lengthwise surface. This groove 13 forms a first enlarged clearance in the interface 81 between the lengthwise surface of the plunger and the inner surface of cylinder 80. When resin 100 escapes into interface 81, it is received into the enlarged clearance fills the groove 13. An outlet for excess resin 100 that flows in the interface 81 is thereby provided, and the frictional resistance to plunger 10 is, in effect, reduced.

Figure 5:
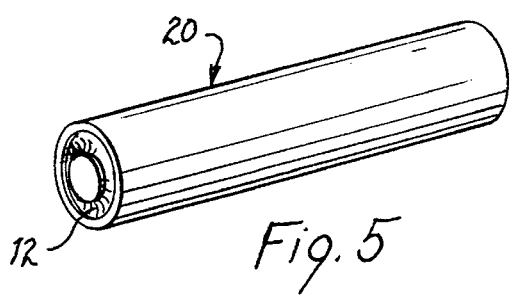
FIG. 5—Perspective view of a second embodiment of the present invention with an annular recess in the bottom side.
Figure 5A:
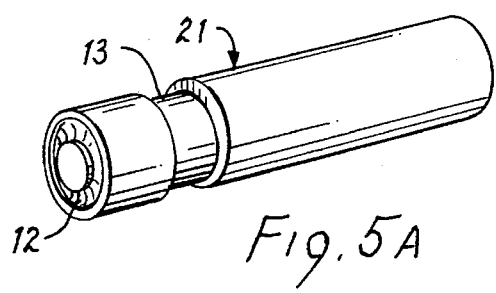
FIG. 5A—Perspective view of a third embodiment of the present invention with an annular recess in the bottom side.
Figure 7:
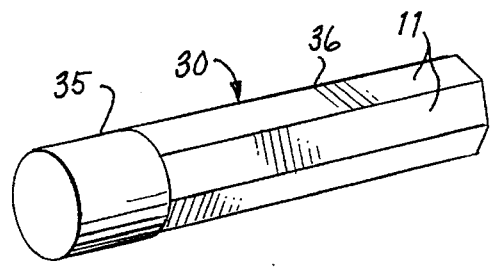
FIG. 7—Perspective view of a fifth embodiment of the present invention with at least one flat side in the upper portion.
Figure 7A:
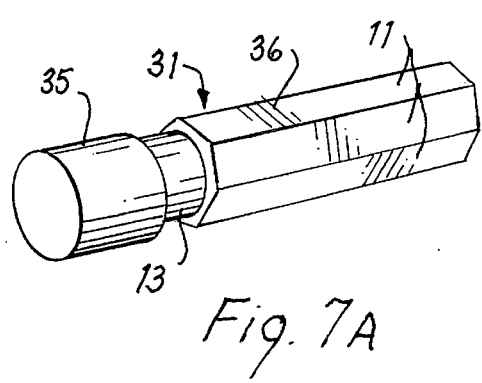
FIG. 7A—Perspective of a sixth embodiment of the present invention with at least one flat side in the upper portion.

FIGS. 5A and 7A respectively show alternate embodiments of the present invention that also incorporate this same circumferential groove 13 feature in their lengthwise surfaces. As seen in FIG. 5A, plunger 20 of the present invention is shown with the additional feature of an annular recess 12 at its bottom side, and as seen in FIG. 7A, plunger 31 of the present invention is shown with the additional feature of six flat sides 11 at its lengthwise surface, as more fully described below.

b. Flat Sides in the Lengthwise Surface

A unique feature of the present invention is that the improved plunger has at least one flat side in its lengthwise surface. FIG. 1 shows plunger 10 having six flat sides 11 in its upper portion 18. As shown in FIG. 2, the flat sides 11 of plunger 10 each form an enlarged clearance in an interface 81 between the surface of the cylinder 80 and the flat sides 11 of the plunger 10. The enlarged clearance receives excess resin 100 that flows into interface 81. Excess resin 100 flows and fills circumferential groove 13 and also flows and fills the space between flat sides 11 and inner surface of cylinder 80, and an enlarged outlet for the resin 100 is thereby provided. Therefore, this unique feature reduces the amount of frictional resistance in the interface 81 caused by excess resin 100 flowing into the interface 81, and the amount of wear and damage to the plunger 10 is, in effect, substantially reduced and eliminated making it more cost effective to operate the molding apparatus which encapsulates electronic components.

As shown in FIG. 1, the circumferential groove provides a first enlarged clearance, but now the six flat sides 11 provide a second set of enlarged clearances for the excess resin 100 that flows in the interface 81. Therefore, plunger 10 has the advantage of combining these features to provide a larger number of outlets for and, accordingly, a greater capacity to receive and accumulate the excess resin 100 in interface 81.

FIGS. 7 and 7A respectively show a fifth and sixth embodiment of the present invention, which incorporate the same six flat sides 11 feature as was disclosed by the first and preferred embodiment of FIG. 1. The embodiment shown in FIG. 7 is a straight cylindrical plunger 30 with six flat sides 11 at its upper portion 36. The embodiment shown in FIG. 7A is a plunger 31, and it is identical to plunger 30 in FIG. 7 except that it has the additional circumferential groove 13 in its lengthwise surface.

Figure 8:
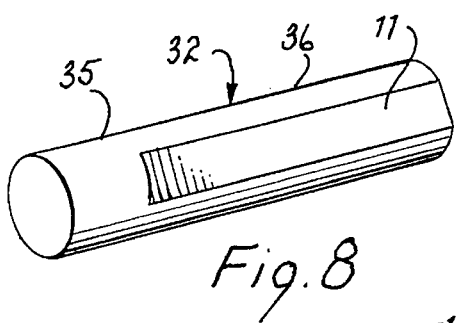
FIG. 8—Perspective view of a seventh embodiment of the present invention with one flat side in the upper portion.
Figure 9:
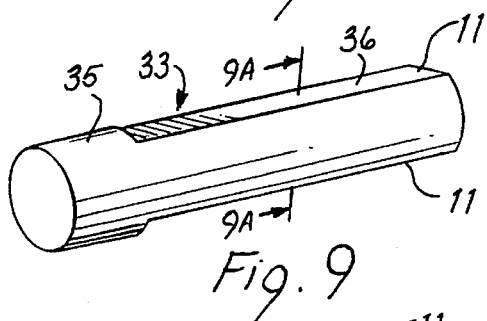
FIG. 9—Perspective view of an eighth embodiment of the present invention with two flat sides in the upper portion.
Figure 9A:
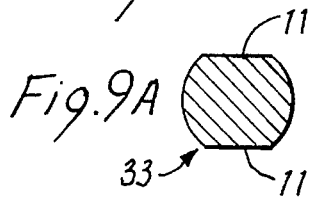
FIG. 9A—Cross sectional view of the upper portion of the plunger taken along the line 9A—9A of FIG. 9.
Figure 10A:
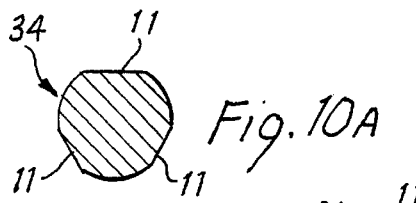
FIG. 10A—Cross sectional view of the upper flat portion of the plunger taken along the line 10A—10A of FIG. 10.
Figure 10:
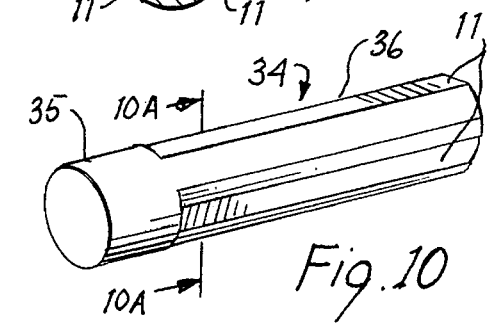
FIG. 10—Perspective view of a ninth embodiment of the present invention with three flat sides in the upper portion.

The improved plunger may have other embodiments that vary according to the number of flat sides in the lengthwise surface. FIG. 8 shows a straight cylindrical plunger 32, which is a seventh embodiment of the present invention, that has one flat side 11 in its upper portion 36. FIGS. 9 and 9A show plunger 33, which is an eighth embodiment that has two flat sides 11 in its upper portion 36, and FIGS. 10 and 10A show plunger 34, which is a ninth embodiment that has three flat sides 11 in its upper portion 36. As stated earlier, each of the flat sides 11 in the various embodiments form an enlarged clearance in interface 81 between the flat sides 11 and inner surface of cylinder 80 to receive excess resin 100. An outlet for excess resin 100 is thereby provided.

c. Stable Guiding Feature

Figure 4:
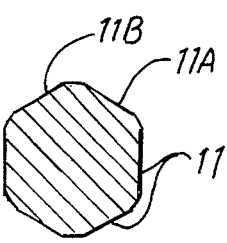
FIG. 4—Cross sectional view of the plunger taken along the line 4—4 of FIG. 3.

As shown in FIG. 1, plunger 10 embodies another feature that makes it an improvement over the prior art plungers. As best seen in FIG. 4, there is shown the hexagonal shape of a cross-section of an upper portion of plunger 10 interrupted by a rounded edge 11C ("rounds") between each flat 11 showing the hexagonal outermost periphery 11B. FIG. 4 also shows a circle 11A that circumscribes the outermost periphery of the upper portion 18 of the lengthwise surface of plunger 10 which includes the outermost points of the rounds 11C. FIG. 3A shows a cross-sectional view of a lower portion 19 of plunger 10, and it shows a circle 12A, which circumscribes the outermost periphery of the lower portion 19 which includes the outside cylindrical surface of plunger 10. Circle 11A in FIG. 4 has a common diameter size with circle 12A in FIG. 3A. The common diameter of a circle circumscribing the outermost periphery of an upper portion 18 of plunger 10 (i.e. circle 11A) and a circle circumscribing the outermost periphery of lower portion 19 are the surfaces which engage the inner surface of cylinder 80 during reciprocation of plunger 10 and are the "bearing" surfaces of plunger 10 which is thereby stably guided on those bearing surfaces as the plunger 10 reciprocates within cylinder 80. Wobbling of plunger 10 is thereby prevented by this top and bottom guiding structure. Thus, the amount of excess resin 100 which can flow into interface 81 is significantly reduced.

FIGS. 5, 5A, 7, 7A, 7B and 8–11 all show additional embodiments of the improved plunger that have this stable guiding feature since each plunger has outermost points encompassed by a circle circumscribing the outermost periphery of an upper portion that has a common diameter with a circle circumscribing the outermost periphery of the lower portion of the plunger. These embodiments can be contrasted with the fourth embodiment in FIG. 6 which does not have this feature.

d. Bottom-Side Annular Recess

Another unique feature of the present invention is that the improved plunger includes an annular recess 12 at the bottom side of the plunger. FIG. 1 shows plunger 10 having an annular recess 12 in its bottom side 12B. The annular recess 12 redirects plasticized resin 100 to flow towards mold cavities 70, and the flow of resin 100 is, therefore, optimized by reducing the tendency of excess resin 100 to flow away from mold cavities 70. The new feature helps ensure that the pressure of the plunger on the resin 100 is sufficient in providing an adequate amount of resin 100 into the mold cavities 70 so that molding defects for encapsulating components 100 are reduced. The annular recess 12 may have various configurations. As best seen in FIG. 3, annular recess 12 has a concave profile in a plane passed through the recess and the longitudinal axis of the plunger.

FIG. 3 shows the annular recess 12 of plunger 10 redirecting the resin 100 to flow towards the mold cavity 70. In prior art plungers with flat bottom sides, as the plunger is reciprocated in the cylinder, the resin 100 is turbulent and unchannelled, and has a tendency to flow outwardly and upwardly into interface 81 and into the interface 84 in those installations where interface 84 exits adjacent the piston-cylinder interface. However, in the present invention if an annular recess 12 with a concave profile is located in the bottom side of the plunger 10, resin 100 will flow through the recess and be driven circularly and inwardly (i.e. circular and inward flow in the cull is created) as shown in FIG. 3, and the amount of resin 100 that tends to flow away from the mold cavities 70 is greatly reduced. Therefore, with the reciprocation of improved plunger 10 in cylinder 80, less resin 100 would flow outwardly and upwardly into interface 81, and more resin 100 would be redirected to flow inwardly and downwardly to mold cavities 70.

Figure 6:
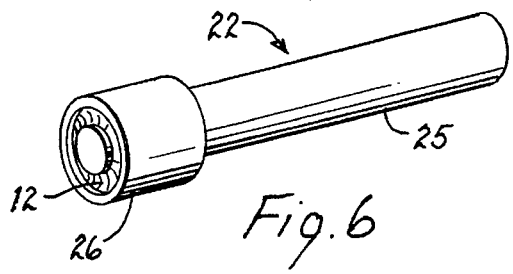
FIG. 6—Perspective view of a fourth embodiment of the present invention with an annular recess in the bottom side.

FIG. 5 shows a straight cylindrical plunger 20, which is a second embodiment of the present invention. Plunger 20 has the annular recess 12 at its bottom side. FIG. 5A shows plunger 21, which is a third embodiment of the present invention, and plunger 21 is identical to plunger 20 in FIG. 5 except that it has the additional circumferential groove 13 feature in its lengthwise surface. FIG. 6 shows plunger 22, which is a fourth embodiment of the present invention, and plunger 22 is similar to plunger 20 in FIG. 5 except that the upper portion of the lengthwise surface has a cylindrical shaft 25 that is smaller in diameter than a cylindrical shaft 26 at the lower portion.

The features of plunger 10 all combine to provide an improved plunger that is used in a molding apparatus for encapsulating electronic components or semiconductor devices more efficiently or effectively.

3. Embodiment Combining Unique Features of Improved Plunger

Figure 11:
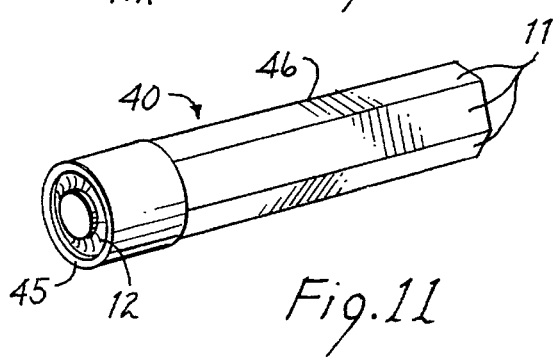
FIG. 11—Perspective view of a tenth embodiment of the present invention with an annular recess in the bottom side and six flat sides in the upper portion.

FIG. 11 shows plunger 40, which is a tenth embodiment of the present invention. Plunger 40 comprises the two unique features of the present invention as described earlier (i.e. the bottom side annular recess feature and the flat sides in the lengthwise surface feature). Plunger 40 has an annular recess 12 at its bottom side 45, and it also has six flat sides 11 at an upper portion 46 of its lengthwise surface. Therefore, plunger 40 has the advantage of redirecting resin 100 to flow towards mold cavities 70 and away from interface 81, and it further has the advantage of providing outlets for excess resin that flows in interface 81 between flat sides 11 and the inner surface of cylinder 80.

4. A Working Example of the Present Invention

A working example of plunger 10 has the following specifications:

1. Material of Plunger: Sub Micron Grade Carbide or Steel
2. Dimensions of Plunger:
   a. Height from bottom to top=1.9566"
   b. Diameter of Circle Circumscribing Outermost Periphery of Lengthwise Surface=0.5901"–0.5902"
3. Dimensions of Bottom Side Annular Recess:
   a. Outer Diameter (O.D.)=0.490"
   b. Inner Diameter (I.D.)=0.360"
   c. Horizontal Width of the Recess=O.D.–I.D./2=0.065"
   d. Maximum Depth of the Recess=0.006"±0.003" (radius)
   e. Finish=#23–#27 Charmilles Finish
4. Dimensions of a Flat Side in the Lengthwise Surface:
   a. Height=1.4266"
   b. Width=0.212"
   c. 60° to Hexagonal Surface
5. Dimensions of Circumferential Groove in Lengthwise Surface:
   a. Height=0.10"
   b. Diameter=0.540"–0.545"
6. Specifications of Inner Plug:
   a. Material: Soft Low Carbon Steel
   b. Height=0.8452"
   c. Diameter=0.355"–0.375"
   d. Clearance Between Plunger and Plug=0.001"–0.003"
   e. Plug is silver soldered to the inside of the plunger.
7. Specifications of Pin:

a. Material: Soft Low Carbon Steel
b. Center Pin location=1.22" from Bottom of Plunger
c. Length=0.551"
d. Diameter=0.105"–0.130"
e. Pin is silver soldered to the plug and plunger.
8. Specifications of Recess at the Top of Plunger:
Depth=0.1614"–0.1680"
Diameter=0.39377"–0.39384"
9. Specifications of Top Threaded Portion:
Drill Diameter Size=0.1660"
Depth=0.60"–0.64"
10. Polish of the Plunger=Polish AA 8 MIN The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. In a resin molding apparatus for encapsulating electronic components having at least one mold assembly which includes both an upper mold element and a lower mold element for providing a mold cavity therebetween in which at least one electronic component to be encapsulated is placed, at least one cylinder located in the molding apparatus adjacent at least one mold cavity and communicating therewith through a passage therebetween for introducing plasticized resin into the cavity, a plunger having a bottom side and a lengthwise surface slidably mounted in each cylinder and having an interface therebetween, the plunger for contacting and pushing plasticized resin into each mold cavity, and a mover mounted to a top side of each plunger for reciprocating the plunger, wherein the improvement comprises:

the plunger having at least one flat side in an upper portion of the lengthwise surface forming a first enlarged clearance in the interface for receiving resin flowing in the interface past the bottom side of the plunger whereby an outlet for excess resin is provided.

2. The improved molding apparatus of claim 1 wherein the plunger having said at least one flat side further comprises:

a circumferential groove in the lengthwise surface of the plunger forming a second enlarged clearance in the interface for receiving resin flowing in the interface whereby a further outlet for excess resin is provided.

3. The improved molding apparatus of claim 1 wherein the plunger having said at least one flat side further comprises:

an upper portion and a lower portion of the plunger having a common diameter of a circle circumscribing the outermost periphery of the lengthwise surface of the upper and lower portions whereby the plunger is stably guided on said portions during reciprocation in the cylinder.

4. The improved molding apparatus of claim 1 wherein the plunger having said at least one flat side further comprises;

an annular recess in the bottom side of the plunger for flowing the plasticized resin toward the mold cavity and away from the interface whereby the flow of resin to the cavity is optimized by reducing the tendency of excess resin to flow away from the cavity.

5. The improved apparatus of claim 4 wherein the annular recess has a concave profile in a plane passed through the recess and the longitudinal axis of the plunger.

6. The improved molding apparatus of claim I wherein the plunger having said at least one flat side further comprises:

a circumferential groove in the lengthwise surface of each plunger forming a second enlarged clearance in the interface for further receiving resin flowing in the interface whereby a further outlet for excess resin is provided;

an upper portion and a lower portion of the plunger having a common diameter of a circle circumscribing the outermost periphery of the lengthwise surface of the upper and lower portions whereby the plunger is stably guided on said portions during reciprocation in the cylinder; and an annular recess in the bottom side of the plunger for flowing the plasticized resin toward the mold cavity and away from the interface whereby the flow of resin to the cavity is optimized by reducing the tendency of excess resin to flow away from the cavity.

7. In a resin molding apparatus for encapsulating electronic components having at least one mold assembly which includes both an upper mold element and a lower mold element for providing a mold cavity therebetween in which at least one electronic component to be encapsulated is placed, at least one cylinder located in the molding apparatus adjacent at least one mold cavity and communicating therewith through a passage therebetween for introducing plasticized resin into the cavity, a plunger having a bottom side and a lengthwise surface slidably mounted in each cylinder and having an interface therebetween, the plunger for contacting and pushing plasticized resin into each mold cavity, and a mover mounted to a top side of each plunger for reciprocating the plunger, wherein the improvement comprises:

an annular recess in the bottom side of the plunger for flowing the plasticized resin toward the mold cavity and away from the interface whereby the flow of resin to the cavity is optimized by reducing the tendency of excess resin to flow away from the cavity.

8. The improved apparatus of claim 7 wherein the annular recess has a concave profile in a plane passed through the recess and the longitudinal axis of the plunger.

9. The improved molding apparatus of claim 7 further comprising:

the plunger having at least one flat side formed in the lengthwise surface, and:

a circumferential groove in the lengthwise surface of the plunger adjacent said at least one flat side forming an enlarged clearance in the interface for receiving resin flowing in the interface whereby an outlet for excess resin is provided.

10. The improved molding apparatus of claim 7 wherein the plunger having said annular recess in the bottom side thereof further comprises:

an upper portion and a lower portion of the plunger having a common diameter of a circle circumscribing the outermost periphery of the lengthwise surface of the upper and lower portions whereby the plunger is stably guided on said portions during reciprocation in the cylinder.

11. The improved molding apparatus of claim 7 wherein the plunger having said annular recess in the bottom side of the plunger further comprises:

the plunger having at least one flat side in an upper portion of the lengthwise surface forming an enlarged clearance in the interface for receiving resin flowing in the interface past the bottom side of the plunger whereby an outlet for excess resin is provided.

12. The improved molding apparatus of claim 7 wherein the plunger having said annular recess in the bottom side of each plunger further comprises:

a circumferential groove in the lengthwise surface of the plunger forming a first enlarged clearance in the interface for receiving resin flowing in the interface whereby a first outlet for excess resin is provided;

the plunger having at least one flat side in an upper portion of the lengthwise surface forming a second enlarged clearance in the interface for further receiving resin flowing in the interface past the bottom side of the plunger whereby a second outlet for excess resin is provided; and an upper portion and a lower portion of the plunger having a common diameter of a circle circumscribing the outermost periphery of the lengthwise surface of the upper and lower portions whereby the plunger is stably guided on said portions during reciprocation in the cylinder.

\* \* \* \* \*